United States Patent [19]

Wöss et al.

[11] 4,370,884
[45] Feb. 1, 1983

[54] OPERATIONAL TESTING DEVICE FOR INLET VALVES AND OUTLET VALVES OF RECIPROCATING ENGINES

[75] Inventors: Gerhard Wöss; Erich Schreiber, both of Graz, Austria

[73] Assignee: Hans List, Graz, Austria

[21] Appl. No.: 215,069

[22] Filed: Dec. 10, 1980

[30] Foreign Application Priority Data

Dec. 19, 1979 [AT] Austria .............................. 8022/79

[51] Int. Cl.³ .................. G01L 3/26; G01L 5/13; G01M 15/00
[52] U.S. Cl. ................. 73/117.3; 73/116; 73/119 R
[58] Field of Search .............. 73/116, 117.3, 118, 73/119 R, 40.5 A, 592

[56] References Cited

U.S. PATENT DOCUMENTS

| | | | |
|---|---|---|---|
| 3,399,563 | 9/1968 | Helms | 73/40.5 A |
| 3,500,676 | 3/1970 | Palmer | 73/40.5 A |
| 3,673,857 | 7/1972 | Teitelbaum | 73/40.5 A |
| 3,777,559 | 12/1973 | Rennick et al. | 73/117.3 |
| 4,133,205 | 1/1979 | Hulls et al. | 73/117.3 |
| 4,252,013 | 2/1981 | Hyanova et al. | 73/117.3 |

FOREIGN PATENT DOCUMENTS

| | | | |
|---|---|---|---|
| 2335052 | 2/1974 | Fed. Rep. of Germany | 73/118 |
| 47-6922 | 2/1972 | Japan | 73/116 |
| 442415 | 11/1974 | U.S.S.R. | 73/40.5 A |
| 461330 | 4/1975 | U.S.S.R. | 73/117.3 |

*Primary Examiner*—Edward R. Kazenske
*Assistant Examiner*—David V. Carlson
*Attorney, Agent, or Firm*—Watson, Cole, Grindle & Watson

[57] ABSTRACT

An operational testing device for inlet valves and outlet valves of reciprocating engines which are separately driven for an operational test comprises at least one microphone arranged in the inlet pipe and at least one microphone arranged in the outlet pipe of the engine, a combined amplifier and electronic filter, and a gate circuit to which the signals of the microphones are supplied after passing the amplifier and electronic filter. To enable a clear identification of the microphone signals of a defective valve as compared to signals generated by valve noise and extraneous noise, a gate circuit is controlled according to the crank angle of the engine, at least one limit value switch is provided to which the signal is forwarded via the gate circuit in a predetermined crank angle area, and an interpretive circuit is controlled according to the crank angle, actuated by the output signal of the limit value switch and allocating the output signal to the particular valve causing the signal.

3 Claims, 2 Drawing Figures

OPERATIONAL TESTING DEVICE FOR INLET VALVES AND OUTLET VALVES OF RECIPROCATING ENGINES

BACKGROUND OF THE INVENTION

This invention relates to an operational testing device for inlet valves and outlet valves of reciprocating engines which are separately driven for this operational test.

DESCRIPTION OF THE PRIOR ART

In known devices of the kind mentioned above the compression pressure of each single cylinder of the reciprocating engine is measured and the values thereof are compared to each other to test the valves for leaks. The necessary pressure measurement is done directly via inserted pressure transducers or indirectly via the measurement of irregularities in the current consumption of the automatic starter. This method is quite simple and quick to apply but only coarse defects can be detected. Although it is possible to relate the defect to a certain cylinder but not to a certain valve, and it is not possible to determine actually whether a leaky valve or damaged piston rings are responsible for a measured pressure drop.

Furthermore, it is known to test the inlet valves and outlet valves for leaks by evacuation of the adjoining pipes and measuring the increase in pressure against time. This method is more exact compared to the aforementioned approach, but also more complicated to apply. Besides, it is not possible to actually determine whether a valve is leaky, because a measured unduly high increase in pressure can likewise result from a leak in the inlet pipe, a damaged seal, or something similar.

It is further known to introduce pressurized air into the compression chamber of the reciprocating engine, e.g., into the combustion chamber of an internal combustion engine, and to determine leakage from the measured pressure drop. This method is substantially adequate compared to the first-mentioned one, but is complicated to apply, and does not afford a clear determination concerning the origin of a determined defect. In the event of a determined large pressure drop it is necessary to test by other means whether the outlet valve, the inlet valve or the piston rings in the respective cylinder are leaky. Furthermore, it is not possible by either of the aforedescribed methods to reach a determination concerning the actual function of the valves, e.g., the actual valve timing.

SUMMARY OF THE INVENTION

It is an object of the present invention to provide an operational testing device for inlet valves and outlet valves of reciprocating engines, by means of which the operational test of the valves is possible in a simple way and which especially offers the advantage of assigning departures from the orderly function to the particular defective valve.

Such is achieved according to the invention by a testing device which comprises at least each one microphone arranged in the inlet pipe and at least one microphone arranged in the outlet pipe of the engine, a combined amplifier and electronic filter, and a gate circuit to which the signals of the microphones are supplied after passing the amplifier and electronic filter, and wherein the gate circuit is controlled according to the crank angle of the engine. The device further comprises at least one limit value switch to which the signal is forwarded via the gate circuit in a predetermined crank angle area, and an interpretive circuit which is controlled according to the crank angle, actuated by the output signal of the limit value switch and allocating this output signal to a particular valve causing the signal. The signals supplied by the microphones originate from the valve noise caused by the seating or lifting of the valve disc relative to the valve seat, as well as by the hissing sound generated by air or gas passing a leakage at the valve seat. These noises are converted by the microphones into electrical signals which are supplied to a gate circuit after passing a combined amplifier and electronic filter, which functions to exclude extraneous noise of different frequency and intensity. The gate circuit is controlled by a suitable device for determining the angular position of the crankshaft of the engine in such a way, that the signal originating from the valve noise is forwarded to the limit value switch only in the crank angle area being relevant for the respective valve. The limit value switch is set, e.g., for the leakage test, in such a way, that, as soon as the hissing which indicates a leakage reaches a predetermined loudness and the resulting electrical signal reaches a predetermined level, an electrical signal is supplied to the interpretive circuit. The interpretive circuit is also controlled according to the crank angle, whereby, even if, e.g., only one microphone is arranged for four outlet valves, a clear determination regarding that valve which has caused the respective signal is possible.

For testing the actual valve timing it is only necessary to change the type of registered noise by changing the filtering of the microphone signals. In each case, the metallic seating noise of the valves is audible instead of the hissing noise for the leakage test.

In multicylinder-engines it is possible, that, e.g., simultaneously with the compression stroke of one cylinder interfering noise such as, e.g., the lifting of the outlet valve of another cylinder, occurs. To enable an exact determination it is especially advantageous if, according to another feature of the present invention, a separate microphone is arranged at the respective branch pipe of every valve to be tested. After removing the adjoining pipes or manifolds, respectively, the microphones are arranged and the testing can occur in the same manner as aforedescribed.

An especially advantageous embodiment of the present invention is characterized by an adapter which is provided for each of the microphones and is attachable to the respective pipe when matching parts are removed. The microphone is accordingly isolated against transmission of sound from the inlet and outlet of the engine, whereby an exact signal may be obtained.

The analyzing of the microphone signals can be carried out for example by a central processing unit, which controls the gate circuit, processes the signals of the limit value switch and assigns these signals according the actual crank angle to the respective cylinders. This arrangement of the circuitry is especially advantageous and reliable, whereby the handling of the testing device is substantially simplified.

DESCRIPTION OF THE DRAWINGS

The present invention is hereinafter more specifically described with reference to the embodiment depicted in the accompanying drawings, wherein FIG. 1 wings schematically shows the device according to the invention associated with a four-cylinder internal combustion engine

DESCRIPTION OF THE PREFERRED EMBODIMENTS

Figure 1:
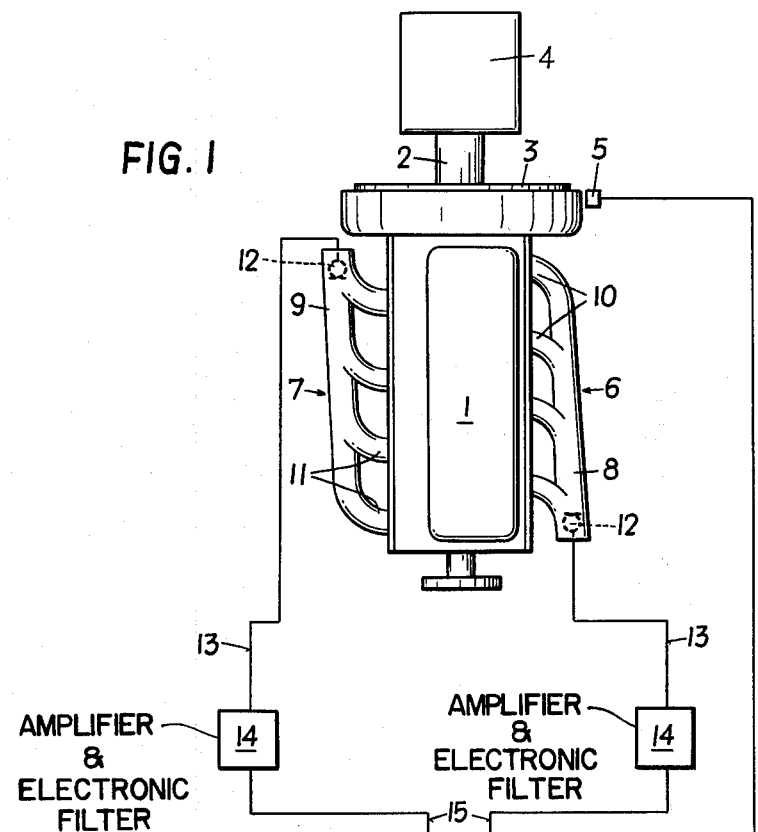

The four-cylinder internal combustion engine 1 in FIG. 1 includes at its power take-off shaft 2 a clutch 3, which function to connect a separate drive 4 and carries angle index marks for a transducer 5 for measuring the crank angle of the crank shaft of the engine. Inlet pipe 6 and outlet pipe 7 comprise manifolds 8 and 9, respectively, which are connected to the respective canals in the cylinderhead of the engine via single branch pipes 10 and 11, respectively. A microphone 12 is disposed in inlet pipe 6 as well as in the outlet pipe 7, and to facilitate installation the aircleaner as well as the exhaust silencer are removed. The microphones 12 are connected via lines 13 to combined amplifier and electronic filters 14 which forward the signals via lines 15 to a gate circuit 16. The gate circuit 16 is supplied via a line 17 with the crank angle signals of the transducer 5 and is connected to limit value switches 18, which activate an interpretive circuit 20 when a certain, predetermined level is exceeded by the signals forwarded from the gate circuit 16. The interpretive circuit 20 is also supplied with the crank angle signals of the transducer 5 via a line 19.

The operation of the device according to the present invention will now be described with respect to a test of the valves for leaks.

The internal combustion engine 1 or the crankshaft thereof, respectively, is driven by the separate drive 4 via the shaft 2. During the compression stroke the inlet valve as well as the outlet valve of every respective cylinder is closed—when the valves are working correctly—and the compression chamber in the cylinder is locked against the inlet pipe 6 and the outlet pipe 7. If any leakage at a valve seat occurs, for example because of a valve disc which is not completely seated at the respective valve seat because of a wrong adjustment, or because of a corroded valve disc, an unaccurate working of the valve seat, or something similar, this leakage is perceptible via a flowing off of the compressed medium from the cylinder at high speed. The velocity of flow of the medium flowing off the leak reaches the sonic barrier already at low differences in pressure and thereby creates a hissing noise of mainly higher frequencies. This hissing noise is recorded by the microphones 12 and converted into an electrical signal, which is prepared by the amplifier and electronic filter 14 in such a way that extraneous noise originating from other parts of the engine are filtered.

The transducer 5 supplies, in coaction with the crank angle signs on the clutch 3, electric signals via the line 17 to the gate circuit 16, by means of which it is possible to determine the respective angular position of the crank shaft exactly. Thus, the signals forwarded to the gate circuit 16 via the lines 15 can be assigned a certain angular position of the crank shaft, or the gate circuit 16 can be timed via the crank angle signals in such a way that the microphone signals are forwarded to the limit value switches 18 only during that time interval, which is—with regard to the crank angle diagram—of interest in connection with the respective operational test, respectively.

The limit value switches 18 are so adjusted that, when exceeding a certain signal level, an output signal is supplied to the interpretive circuit 20. It is therefore possible that, e.g., a hissing noise of a predetermined loudness evidencing a certain leakage, is tolerated at the measurement, or that an indication error resulting from extraneous noise with lower level is prevented.

The interpretive circuit 20 is also supplied with the crank angle signals of the transducer 5 via the line 19, whereby at the occurrence of a signal indicating the exceeding of the switching level of the limit value switches 18, this signal—and, accordingly, the leakage indicated by this signal—can be assigned to the particular causing valve.

If, in multicylinder-engines, otherwise generated noise occurs simultaneously with the compression stroke of one cylinder, e.g., by the lifting of the exhaust valves of other cylinders, it is also possible to remove the manifolds of the inlet pipe and outlet pipe, to identify the generated signals with the causing valve. In such case a separate microphone is arranged at every branch pipe or directly at every opening of the inlet and outlet pipes on the cylinderhead.

To test the actual valve timing with a testing device according to this invention, it is only necessary to change the response characteristic of the circuit depicted in FIG. 1 from the hissing noise generated during the compression stroke to the metallic noise generated by the seating and lifting of the valves.

Figure 2:
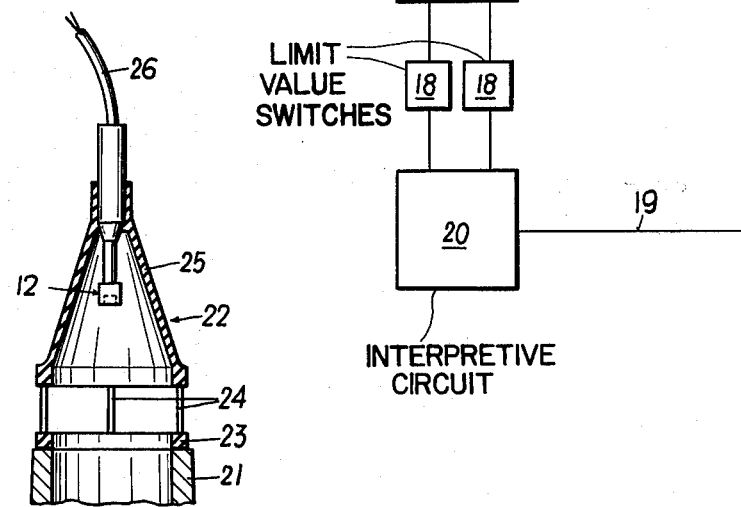
FIG. 2 shows a detail of the microphone arrangement.

As shown in FIG. 2 an adapter 22 which is substantially bell-shaped is arranged at a feed pipe 21 of the inlet pipe or outlet pipe, respectively, of an internal combustion engine (not shown). For this purpose other matching parts, such as silencer, aircleaner, etc., are removed. The adapter 22 is made of rubber or any other suitable material and has a connecting ring 23 lying against feed pipe 21. The connecting ring 23 supports a receiving bell 25 for the microphone 12 by means of brackets 24. The microphone 12 is connected to electric circuit means (not shown) via a line 26.

Because of the brackets 24 there is enough free-space sectional area in the direction of the feed pipe 21, and the microphone 12 is sound isolated against the feed pipe 21 by the entire adapter, whereby the generation of a clearly recognized microphone signal is significantly improved.

I claim:

1. An operational testing device for inlet valves and outlet valves of reciprocating engines which are separately driven for an operational test, comprising at least one microphone disposed in the inlet pipe and at least one microphone disposed in the outlet pipe of the engine, combined amplifier and electronic filters to which said microphones are respectively connected, a gate circuit to which signals are forwarded from said combined amplifier and electronic filters, means supplying said gate circuit with crank angle signals from the engine, limit value switches connected to said gate circuit for the reception of the signals therefrom in a predetermined crank angle area, and an interpretive circuit connected to said switches for activation thereby when a certain, predetermined level is exceeded by the signals forwarded from said gate circuit, said means also supplying said interpretive circuit with crank angle signals from the engine, whereby said interpretive circuit allocates a signal received from said switches to one of said valves causing said received signal.

2. The device according to claim 1, wherein said inlet and outlet pipes include branch pipes for said valves, microphones being disposed in the branch pipes of each of said valves to be tested.

3. The device according to claim 1 or 2, wherein an adaptor is provided for each of said microphones and is attached to said pipes.

* * * * *